Patented Sept. 8, 1925.

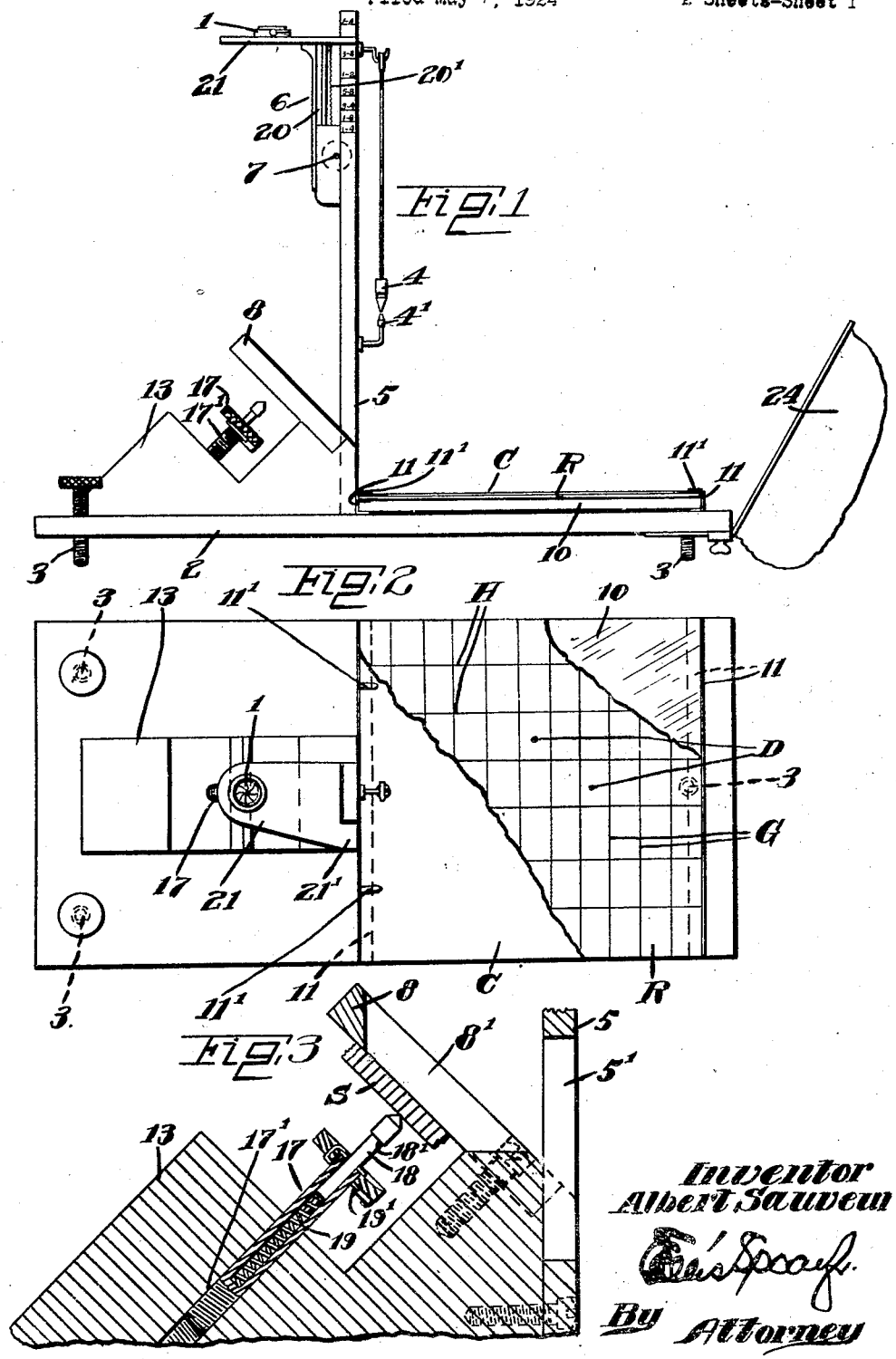

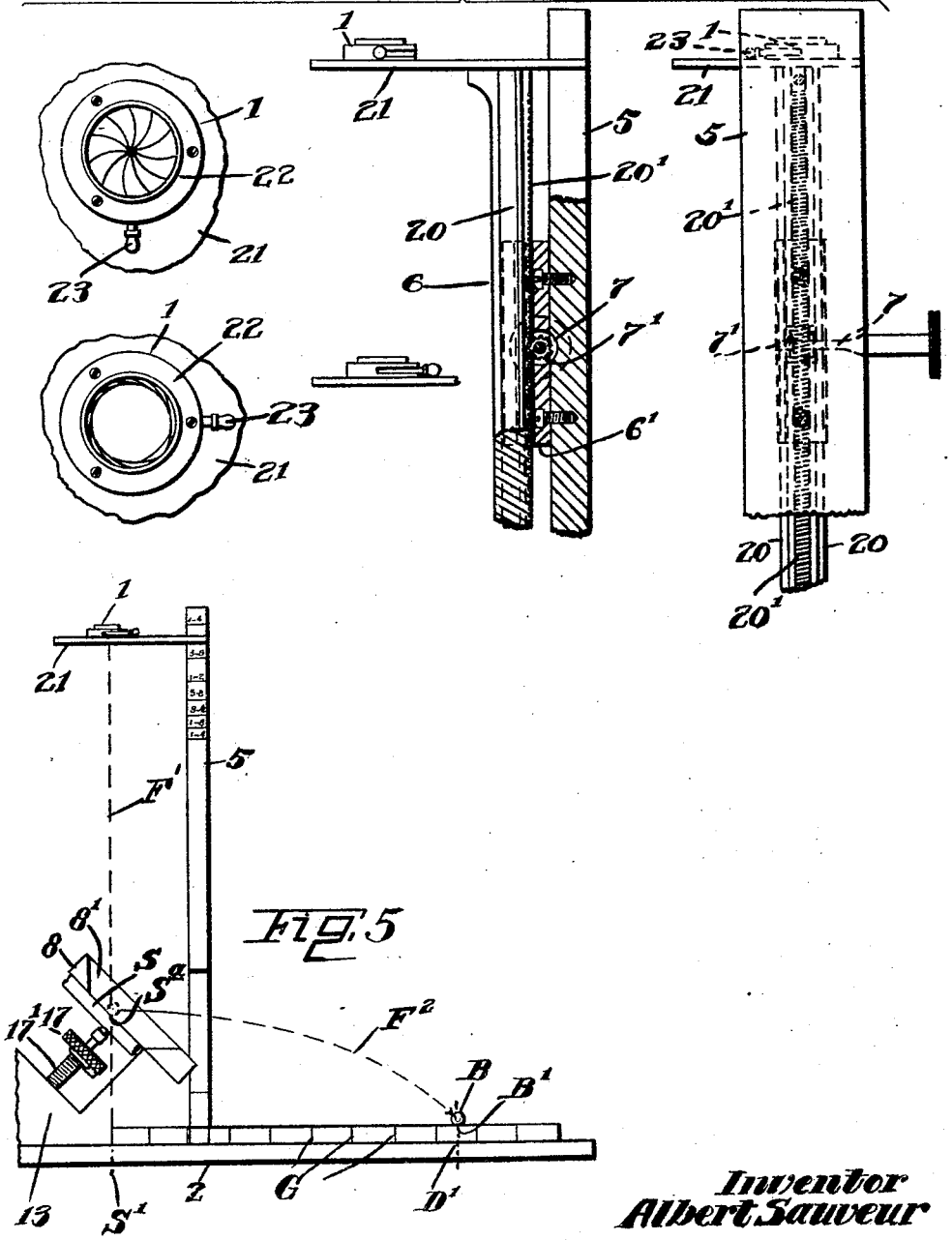

1,552,652

UNITED STATES PATENT OFFICE.

ALBERT SAUVEUR, OF CAMBRIDGE, MASSACHUSETTS.

METHOD AND APPARATUS FOR TESTING HARDNESS.

Application filed May 7, 1924. Serial No. 711,642.

*To all whom it may concern:*

Be it known that I, ALBERT SAUVEUR, a citizen of the United States, residing at Cambridge, in the county of Middlesex, Commonwealth of Massachusetts, have invented new and useful Improvements in Methods and Apparatus for Testing Hardness, of which the following is a specification.

My present invention relates to a novel method of an apparatus for testing the hardness of objects and particularly for the accurate testing of such materials as metals whose hardness is commercially or scientifically important.

Various ways and means of testing hardness have been devised including the measurement of the amount of depression caused in the surface by a small very hard ball under pressure, various methods of scratching surfaces under standard conditions and measuring the width of the scratch or by measuring the vertical rebound of a hammer from the surface to be tested. The test by vertical rebound has met with considerable favor but even with carefully constructed apparatus it is difficult to make accurate tests as the human equation entered very considerably into the result.

In accordance with my invention I angularly impinge a ball upon the surface to be tested and receive it upon a horizontal plane measuring the length of its flight on such a plane as a base line subtending the curve of its flight in trajectory. This method I have found extremely accurate and one capable of mechanical precision and of definite record, thus eliminating personal matters of temperment and judgment.

There are, however, two factors involved that I believe have not been recognized as important to accuracy. These are thickness of specimen and its stress. These features are provided for in my invention, as will be discussed later, in connection with the embodiment and practice chosen for discussion.

As illustrative of my invention I will show in the accompanying drawings and will describe in the following specification, a simple apparatus well adapted to the practice of my invention and well illustrating in its use the principles of the method involved. Throughout the specification and drawings like reference characters are employed to indicate corresponding parts. In the drawings:

Fig. 1 is a side elevation of an apparatus in accordance with my invention.

Fig. 2 a plan view thereof.

Fig. 3 is an enlarged section of the specimen holder.

Fig. 4 is a sectional detail of the adjustable drop and release, and

Fig. 5 is a diagrammatic indication.

In the practice of my method various apparatus may be used but the general principles involved may be practiced by comparatively simple apparatus to give extremely accurate results. Fundamentally my method may be considered with reference to a simple diagrammatic illustration shown in Fig. 5. In this S indicates the specimen to be tested for hardness, B indicates the ball, 1 indicates the ball support. The ball's path in dropping is indicated at $F^1$ and its ricochet at $F^2$. I have indicated at G lineal measurement reading from a point preferably directly below the spot $S^a$ upon which the ball will impinge when dropped so as to indicate a distance $S^1$—$D^1$. It will therefore be seen that the ball B in dropping through the path $F^1$ will ricochet form the spot $S^a$ in a trajectory $F^2$ to a position $B^1$ on the plane P.

It is not necessary to measure the actual length of the trajectory $F^2$ as the base line or distance $S^1$—$D^1$ affords a basis for actual comparison with predetermined standards of hardness. The distance may be indicated by graduations G to give readings according to any unitary system desired, as for example, in the well known Brinell scale. In actual practice I have found such a device as I have illustrated in the accompanying drawings to be very statisfactory and to give very accurate results. In this embodiment I provide a substantial base 2 preferably mounted on adjustable feet as at 3 so that the base may be accuartely leveled as determined by a plumbing device 4 which may be compelled to register with a plumb point $4^1$. On the base and adjacent one end thereof I mount a specimen holder which may be conveniently formed as a base 13 carrying an inclined plate 8 slotted as at $8^1$. The specimen S is clamped against this plate by a milled screw 17 having a hollow stem 17¹ threaded into the base 13. Within the hollow stem of the screw is supported a plunger 18 shouldered as at 18¹ and supported by a spring 19. This plunger supports a specimen S while the screw is being adjusted to bring the predetermined pressure aganist the specimen S to clamp it in place.

I have found that while the specimen should be firmly supported, that any clamping pressure brought to bear on it must be in accordance with a predetermined standard as my test is so delicate that variant stressing of the specimen will produce different results. This adjustment of application of pressure may be accomplished by touch or the knurled head of the screw 17 may be formed with a spring ratchet adapted to yield at a predetermined pressure, as at 19¹.

To the front end of the base block 13 I rigidly attach an upright plate 5 slotted at 5¹ in alignment with the slotting of the plate 8. Adjustably mounted on the rear side of this plate is a block 6 which may be clamped at predetermined elevations with reference to the specimen. I provide graduations on the edge of the plate 5 as indicated. These graduations are for specimens of different thickness. For example, the top graduation would indicate the proper elevation of the ball for a ¼″ specimen, the next lower for a ⅜″ the next lower for ½″ the next lower for ⅝″, the next for ¾″, the next for ⅞″ and the lowest for 1″. I find that this range is generally satisfactory for laboratory purposes, but obviously the scale might be arranged for other variations in thickness, and the apparatus arranged for other heights according as different conditions might be encountered.

The block 6 is provided with a slideway 6¹ into which projects a pinion 7¹ mounted on the shaft of a knurled wheel 7. The shaft of the knurled wheel 7 which carries the pinion 7¹ has bearing at each end in the side walls of the block 5 as indicated in dotted lines in the figure at the right of the group in Fig. 4. In this slideway is held a slide 20 formed with a rack 20¹ with which the pinion 7¹ is adapted to mesh and whereby the slide may be raised and lowered. At its upper end the slide 20 carries a shelf 21 one side of which is carried over as at 21¹ to act as a pointer with reference to the graduations on the edge of the plate 5. The platform has an aperture over which is mounted the ball support and release consisting of a frame 22 within which are mounted releasing members after the manner of the ordinary iris or diaphragm construction similar to that used in the photographic camera. These may be operated by a handle as at 23. When the leaves are closed the ball will be supported in centered alignment with the theoretical spot S¹ upon which it is to be dropped. When the handle 23 is moved the ball is dropped with a clean symmetrical release falling to the specimen from which it ricochets along the path F².

The impact of the ball is received preferably upon a recording device or sheet for which purpose I find an ordinary sheet of carbon paper such as is used for typewriters to be entirely adequate and satisfactory. Beneath this sheet I preferably place a record chart as indicated at R. This is provided with cross lines G which reads with reference to the base line S¹ being parallel thereto. It may also conveniently be ruled transversely of these lines as at H so as to make separate squares available by a simple lateral shifting of the paper and so also as to make possible the detection of any lateral variation in the trajectory of the ball. The carbon paper C and the chart R are supported upon a hard plate preferably of glass as indicated at 10 which is held upon the bed 2 by angles 11 to which are preferably attached like clips 11¹ for holding the paper smooth and in position. At the end of the base 2 I preferably mount a back stop 24 which is shown as made as a detachable back net or cage which may be slipped on to the end of the base 2.

Any number of test balls B may be dropped from the release as described and their records taken and compared and checked. The specimen should be shifted after the drop of each ball as my test is so delicate that even the slight impact of the ball upon any point S¹ increases the hardness to such an extent that it produces a variation in the indicated dot. The angle of the specimen may be varied, although I find that 45° gives a sufficient length of base line for the trajectory F².

The position and character of the receiving area R may be varied and may also be a horizontal or inclined plane or curved as desired so that the flight of the ball may be intercepted according to any predetermined standard or plan. I preferably but not necessarily mount the glass plate which carries the record sheet R and the carbon sheet C slightly below the plane of the surface of the specimen S to be tested as this gives to the trajectory F² not only a slightly greater length but under the component of gravity makes its impact on the carbon paper of slightly higher angle so that the dots D are more distinct and more punctiform than if the angle was lower.

While I have referred in my description rather specifically to the object dropped as a "ball" it will be understood that the apparatus might be arranged to cause the ricochet of an object other than a ball.

The ball has however in my systems a great specific advantage. By reason of its spherical form it may be dropped freely and without the influence of a guidway or other factor liable to influence an inconstant friction.

I therefore consider as important in novelty both the ball and its free drop and in relation thereto the angular disposition of the specimen.

My invention is capable of other uses than that of testing surfaces as indicated above as referred to in test balls employed. In practicing my invention in the above or in other uses the actual structure of the apparatus might be considerably varied both as to size and as to construction, although the general features herein shown are simple and advantageous. All such modifications in method and apparatus are therefore to be considered as within the scope of my invention, within the reasonable limits of the appended claims.

What I therefore claim and desire to secure by Letters Patent is:

1. In an apparatus for testing hardness, a support for a specimen, an object of predetermined hardness, means for uniformly mechanically directing the object upon a predetermined spot in the specimen so as to permit it to ricochet and means for receiving it at the end of its flight including a recording and chartered surface whereby the point of landing of the ball is marked.

2. In an apparatus for testing hardness, a support for a specimen, an object of predetermined hardness, means for uniformly mechanically directing the object upon a predetermined spot in the specimen so as to permit it to ricochet and means for receiving it at the end of its flight whereby the point of landing of the ball is marked.

3. Apparatus for testing hardness consisting of a support for a specimen, a test ball, means for uniformly mechanically directing a ball upon a predetermined spot in the specimen so as to permit it to ricochet, and means for receiving the ball at the end of its flight including a recording and chartered surface whereby the point of landing of the ball is marked.

4. In an apparatus for testing hardness, a specimen plate, means for yieldingly clamping the specimen to the plate, means for dropping an object of predetermined hardness upon a predetermined spot on the specimen so as to cause it to ricochet.

5. In an apparatus for testing hardness, a specimen plate, means for yieldingly clamping the specimen to the plate, means for dropping an object of predetermined hardness upon a predetermined spot on the specimen so as to cause it to ricochet and means for receiving it at the end of its flight whereby the point of landing of the object is determinable.

6. In an apparatus for testing hardness, means for angularly supporting a flat face specimen, means adjustable as to height for supporting a testing ball including a release whereby the ball may be mechanically dropped.

7. In an apparatus for testing hardness, an apertured plate, means for yieldingly clamping the specimen to the plate, means for dropping an object of predetermined hardness upon a predetermined spot on the specimen so as to permit it to ricochet and means for receiving it at the end of its flight whereby the point of landing of the object is determinable.

8. In an apparatus for testing hardness, means for angularly supporting a flat face specimen, means adjustable as to height for supporting a testing ball including an iris release whereby the ball may be mechanically dropped.

9. In an apparatus for testing hardness, an apertured specimen plate, means for yieldingly clamping the specimen to the plate, means adjustable as to height for supporting a testing ball including an iris release whereby the ball may be mechanically dropped.

10. In the method of testing hardness the determination of degree of angular ricochet of a standard spherical object from a standard specimen and in similarly testing other specimens by angular ricochet of said standard object to secure a comparison of hardness by resilience as so indicated.

11. In a method of testing hardness, the measurement of ricochet of a spherical body from the face of a specimen disposed in a plane at an angle to the perpendicular.

12. In an apparatus for testing hardness, means for supporting a flat faced specimen, means for freely projecting a standard spherical body angularly upon the surface thereof and in measuring its ricochet from such specimen.

ALBERT SAUVEUR.